United States Patent Office 3,219,193
Patented Nov. 23, 1965

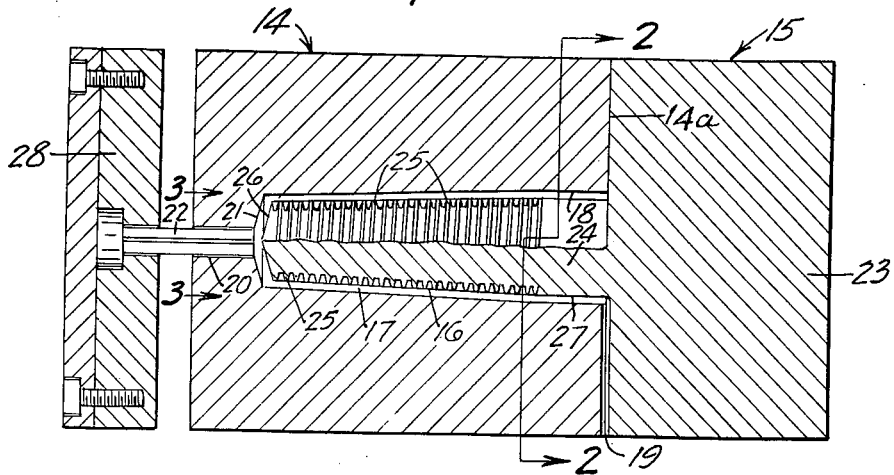
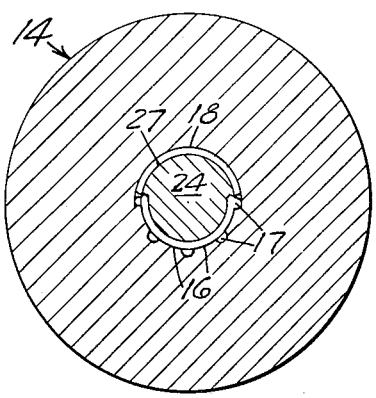
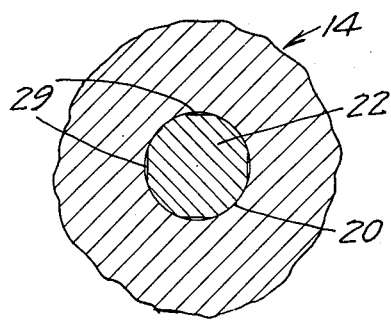
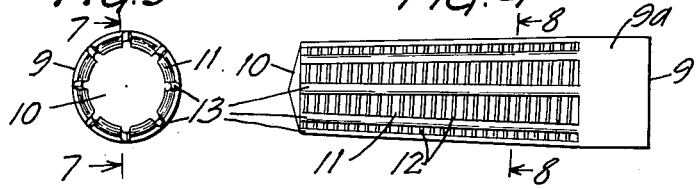
INVENTOR
THOMAS W. TECHLER
BY *John E. [signature]*
ATTORNEY

3,219,193
TUBULAR STRAINER
Thomas W. Techler, North St. Paul, Minn., assignor, by mesne assignments, to Union Tank Car Company, Chicago, Ill., a corporation of New Jersey
Original application Aug. 27, 1958, Ser. No. 757,515. Divided and this application Apr. 27, 1961, Ser. No. 107,617
1 Claim. (Cl. 210—497.1)

This application is a division of my application Serial Number 757,515, filed August 27, 1958 and now abandoned.

This invention relates to tubular strainers, and particularly to an improved strainer which is adapted to be molded from thermoplastic or thermosetting resins and having fine slots of accurately controlled width and shape for the passage of fluids.

In water treatment tanks and in other apparatus requiring the separation of solid particles from fluids, tubular strainers or distributors have been used for many years. However, the available strainers of this type have not been entirely satisfactory for various reasons. Among these are their high cost, tendency to clog, reactiveness in corrosive fluids and lack of uniformity in the width of slots in the narrower sizes. When constructed from metal, such strainers are also subject to electrolytic action in certain types of liquid treatment apparatus. Such action greatly shortens the useful life of the strainers and either progressively increases or decreases the width of the slots or other fluid passages. These disadvantages are substantially obviated by the present invention.

Specifically, among the objects of my invention are to provide a low cost tubular strainer which is adapted to be molded as a finished unit from a suitable strong, non-reactive plastic material and having flow passages of accurately controlled, uniform width.

Other objects will be evident from the following specification and claims.

In the accompanying drawing one embodiment of my improved strainer and a mold for forming it are illustrated, by way of example and not for the purpose of limitation.

Referring to the drawing:

FIGURE 1 is a part longitudinal sectional view and part elevational view showing the several parts of my improved mold in their closed or molding position;

FIG. 2 is a cross sectional view through the mold parts taken approximately on the line 2—2 of FIG. 1;

FIG. 3 is a fragmentary cross sectional view on a larger scale taken on the line 3—3 of FIG. 1, showing particularly the ejector pin in its guide bore in the hollow part of the mold;

FIG. 4 is a side elevational view showing one of my improved tubular strainers;

FIG. 5 is a left end view of the same;

FIG. 6 is a right end view of the same;

FIG. 7 is a longitudinal sectional view taken on the line 7—7 of FIG. 5, showing a fragmentary portion of the strainer on a larger scale, and FIG. 8 is a cross sectional view of the strainer taken on the line 8—8 of FIG. 4.

Referring to FIGS. 4-8, my improved strainer is of generally tubular shape having an open end 9 and a closed end 10. Adjacent to the open end 9a substantially cylindrical, imperforate portion 9a is provided for connection with a fitting or conduit (not shown). Extending from the imperforate portion 9a to the closed end 10 is a helical member 11 the convolutions of which are spaced one from another to provide a continuous helical flow slot 12 of predetermined width. Longitudinally extending ridge members 13 are integral with the helical member 11 and extend from the closed end 10 to the opposite end portion 9a of the strainer. The ridge members 13 are spaced at suitable intervals around the periphery of the strainer as required to impart adequate strength while minimizing obstructions to the flow of fluid through the helical slot 12 to and from the interior of the strainer. To this end, the width of each ridge member 13 is only a small or minor fraction of the length of the arcuate segments of the slot 12 between ridge members. As best shown in FIG. 7, the flank surfaces of convolutions of the helical member 11 converge radially outward so that the flow passages afforded by the slot 12 are more restricted at their outer peripheries than at their inner peripheries.

My improved mold for forming tubular strainers, as illustrated in FIGS. 1, 2 and 3, comprises a hollow part indicated generally at 14 and a core part indicated generally at 15. The hollow part is formed with an interior elongated annular cavity surface defined by longitudinally extending arcuate segments 16 separated by longitudinally extending grooves 17. The width of each arcuate segment 16 greatly exceeds the width of each groove 17.

A short, substantially cylindrical surface 18 extends in continuation of the outer peripheries of the groove segments 17 to an end surface 14a which is perpendicular to the longitudinal axis of the mold cavity surfaces 16 and 18. A gate passage 19 for the admission of plastic material to the mold cavity extends radially across the end surface 14a of the part 14. One-half of this gate passage is preferably formed in an abutting surface of the part 15. At its opposite end the part 14 is formed with a cylindrical bore 20 coaxially disposed to the mold cavity. The bore 20 extends to an outer end surface of the part 14 from an inner end surface 21 of the cavity to receive an ejector pin 22.

Core part 15 has a body member 23 and a core member 24 which removably fits in the cavity of the hollow part 14. A helical, screw thread-like member 25 is formed on the periphery of core member 24 to fit in the mold cavity with the outer peripheries of the several convolutions of member 25 in contact with the arcuate segments 16 of the cavity peripheral surface. The convolutions of member 25 have flank surfaces which converge radially outward to slightly flat top surfaces equal in width to the width of the slots required in the strainers to be formed in the mold. An inner end surface 26 is formed on the core member 24 to fit in spaced relation to the end surface 21 of the cavity. A short substantially cylindrical surface 27 is also formed on the core member 24 to fit in suitably spaced relation to the surface 18 of the cavity.

To facilitate the removal of the molded strainers and core member from the mold cavity, the latter is tapered longitudinally from its open end to its closed end and the core members 24 and 25 are similarly tapered, the smaller end of the cavity being the closed end. Such a taper makes it feasible to provide one-piece cavity and core parts and also results in the formation of tubular strainers having desirable uniformity in the distribution of flow through the slot segments from end to end of the foraminous periphery.

As shown in FIG. 1, the ejector pin 22 is mounted on a suitable support 28 which is normally spaced from the end surface of the hollow part 14 during the molding operation. To permit air to escape from the mold cavity during the molding operation the ejector pin 22 is preferably formed with a plurality of flat longitudinally extending surfaces 29 which coact with the cylindrical bore surface 20 of the hollow mold part to afford minute vent passages.

To use the mold, core member 24 is inserted into the cavity in the part 14 to close the mold at the surface 14a and the ejector pin 22 is retracted as indicated in FIG. 1. Suitable plastic material for forming the strainers is then injected through the gate 19 to progressively fill the cavity while air escapes through the minute passages formed by the flat surfaces 29 and bore surface 20. The plastic material is then allowed to set or harden in the mold. Thereupon the mold is opened and the strainer tube is removed, together with the core member 24, with the aid of the ejector pin 22. Finally the strainer is removed from the core member 24 by unscrewing the strainer from the helical member 25. Further details of the procedure for ejection molding are well known in the art and form no part of the present invention.

A preferred thermoplastic material for forming my tubular strainers is nylon plastic. Strainers molded from this plastic are particularly well adapted for use in water softener tanks for excluding finely divided base exchange resin material from the liquid inlet and outlet pipes connected to the water softener tanks. For such use the cylindrical end portions 9 of a pair of the strainers are secured by suitable means to the inlet and outlet fittings so that the strainers project into the upper and lower portions of the tank. My improved strainers are adapted for use in various types of water treatment apparatus including mechanical or sand filters as well as in water softeners and in other fields of use.

High rates of flow combined with efficient straining out of solid particles are obtained as a result of my arrangement of the continuous helical member 11, the convolutions of which are spaced to provide the continuous, substantially uninterrupted helical slot 12. Unusually close spacing of the convolutions of the slot 12 may be provided combined with adequate strength afforded by the longitudinally extending ridge members 13 which project from the outer periphery of the member 11, and taper outwardly away from the outside surface of member 11, as shown in FIG. 8.

I claim:

In a strainer for use in liquid treating apparatus in which liquid flows through finely divided liquid treating solids, the improvement comprising:
(A) a unitary tubular body molded from corrosion resistant synthetic plastic material, said body having
 (1) an open end adapted to be coupled to a liquid conduit,
 (2) a closed end, and
 (3) a longitudinal taper toward said closed end;
(B) there being flow openings in said body defined by
 (1) a single, continuous helical member with fixed dimensions, the convolutions of said member being spaced uniformly to form a single continuous slot having a uniform minimum width of a size that excludes said liquid treating solids, and
 (2) a plurality of longitudinally extending, uniformly peripherally spaced smooth-surfaced reinforcing ridge members intersecting the outside surface of said helical member with their inside surfaces and being integral with said member at the intersections, and
 (3) said taper toward said closed end causing said flow openings to decrease in area toward said closed end, whereby uniform distribution of liquid flowing through said openings in promoted;
(C) said helical member having a solid substantially V-shaped cross section truncated at its narrow end,
 (1) the wide end of said V defining a portion of the outside surface of said body,
 (2) the narrow truncated end of said V defining as the inside of said body a surface which is uninterrupted except for said slot, whereby resistance to liquid flow from the inside to the outside of said body is reduced,
 (3) the helical slot defined by said spaced convolutions being wider at said inside surface than at said outside surface, and thus said flow openings having their minimum width at the outside of said body, whereby clogging of said openings by such finely divided solids when liquid is flowing from the outside to the inside thereof is prevented; and
(D) said ridge members providing minimal impedance to liquid flow from the inside of said body as a result of having
 (1) a width which is a minor fraction of the distance separating adjacent ridge members,
 (2) the reinforcing mass thereof projecting and tapering outwardly away from the outside surface of said helical member, and
 (3) only a smooth inside surface obscuring said slot so as to form a continuation of said outside surface of said helical member.

References Cited by the Examiner

UNITED STATES PATENTS

| | | | |
|---|---|---|---|
| 2,314,477 | 3/1943 | Bodey | 210—497 X |
| 2,342,913 | 2/1944 | Williams et al. | 210—497 X |
| 2,747,742 | 5/1956 | Royer et al. | 210—497 |
| 2,779,478 | 1/1957 | Wahlin | 210—497 X |

FOREIGN PATENTS

| | | |
|---|---|---|
| 170,845 | 3/1952 | Austria. |
| 164,732 | 8/1955 | Australia. |
| 249,113 | 3/1948 | Switzerland. |

REUBEN FRIEDMAN, *Primary Examiner.*

HERBERT L. MARTIN, CARL F. KRAFFT, HARRY B. THORNTON, *Examiners.*